United States Patent [19]

Randall

[11] 4,072,791
[45] Feb. 7, 1978

[54] SHEET MATERIAL WITH MULTICOLOR STRIATED PATTERN

[75] Inventor: Robert E. Randall, Kensington, Conn.

[73] Assignee: Rowland, Incorporated, Berlin, Conn.

[21] Appl. No.: 733,000

[22] Filed: Oct. 18, 1976

Related U.S. Application Data

[62] Division of Ser. No. 593,882, July 7, 1975, Pat. No. 4,011,292, which is a division of Ser. No. 457,770, April 4, 1974, Pat. No. 3,920,366.

[51] Int. Cl.² .............................. B29F 1/12; B29F 3/12
[52] U.S. Cl. .................................. 428/221; 428/107; 428/112; 428/114; 264/75; 264/171; 264/172; 264/173; 264/174; 264/175
[58] Field of Search .............. 428/107, 112, 114, 221; 264/171, 172, 173, 174, 175, 75

[56] References Cited

U.S. PATENT DOCUMENTS

| | | | |
|---|---|---|---|
| 3,422,175 | 1/1969 | Rowland | 264/75 |
| 3,914,362 | 10/1975 | Randall | 264/75 |
| 3,920,366 | 11/1975 | Randall | 264/175 |

Primary Examiner—Marion E. McCamish

[57] ABSTRACT

A synthetic plastic sheet material having a multicolor striated pattern therein is disclosed. The synthetic plastic sheet material has a multiplicity of bands of differentially colored resin disposed within a matrix resin and the bands have striations extending longitudinally of the sheet material. Some of the bands extend angularly to others of the bands so as to provide a grid pattern. The bands of one angular orientation are disposed at a depth within the matrix material which is different from that of the bands of the other angular orientation. A multiplicity of bands of each orientation are provided across the width of the sheet material and the bands have relatively narrow striations extending longitudinally of the sheet material.

3 Claims, 9 Drawing Figures

SHEET MATERIAL WITH MULTICOLOR STRIATED PATTERN

CROSS REFERENCE TO RELATED APPLICATIONS

The present application is a division of copending application Ser. No. 593,882, dated July 7, 1975 now U.S. Pat. No. 4,011,292 granted Mar. 8, 1977 as a division of application Ser. No. 457,770 filed Apr. 4, 1974, now U.S. Pat. No. 3,920,366 granted Nov. 18, 1975.

BACKGROUND OF THE INVENTION

For more than a decade, there has been considerable effort devoted to the producing of synthetic thermoplastic sheet material having differentially colored bands or layers therein. The materials originally developed employing differentially colored bands are of the type illustrated in U.S. Pat. No. 2,985,558 granted May 23, 1961 to William P. Rowland and it can be seen that the bands of the differentially colored material extended in a direction generally parallel to the direction of extrusion. Other techniques for introducing differentially colored material in the body of the extruded sheet are shown in U.S. Pat. No. 2,632,204 to Murray and U.S. Pat. No. 2,803,041 to Hill et al.

For some applications, it is extremely desirable that the differentially colored materials not extend in a parallel pattern to the direction of the extrusion and this is particularly so in the optical frame industry wherein patterns of varying appearance are constantly desired. Various techniques have been proposed to provide interruption in an otherwise parallel pattern for the differentially colored material, among which is that illustrated in U.S. Pat. No. 3,274,646 to Krystof. Techniques for producing unusual multilayered and swirl patterns are described in U.S. Pat. No. 3,443,278 and U.S. Pat. No. 3,531,828 to Jan P. Nauta and U.S. Pat. No. 3,422,175 to William P. Rowland.

One of the most popular patterns over the past years has been a Havana pattern which effectively comprises a basketweave design wherein differentially colored material from a crosshead extruder is discharged from two series of vertically spaced ports fed intermittently by means of screws or the like. Such designs have proven quite popular and there have been patterns produced using two different colors for the bands providing the basketweave design.

One of the objections to the Havana pattern has been that all of the components of color extend diagonally of the sheet material. There have been efforts to superimpose color effects which would soften the basketweave design which have frequently included laminating techniques.

It is an object of the present invention to provide a novel and highly attractive synthetic plastic sheet material having a multiplicity of bands of differentially colored resin disposed within a matrix resin and in which the bands have striations extending longitudinally of the sheet material.

Other objects and advantages of the invention will appear from the following description.

SUMMARY OF THE INVENTION

It has now been found that the foregoing and related objects are attained by providing a differentially colored extruded thermoplastic sheet material comprising a matrix of synthetic thermoplastic resin and a multiplicity of bands of differentially colored thermoplastic resin encapsulated therein, with some of the bands extending angularly to others of the bands so as to intersect with them to provide a grid pattern. The bands of one angular orientation are disposed at a depth within the matrix different from that of the bands of the other angular orientation. A multiplicity of each orientation of the bands is provided across the width of the sheet material, the bands having relatively narrow striations extending longitudinally of the sheet material.

Other objects of the invention are attained when the bands of one angular orientation are of a first color, which is distinguished from that of the matrix and the bands of the other angular orientation are of a color distinguished from that of the matrix and of the bands of the first angular orientation, with the striations of the bands producing some blending of the colors of the bands of the two different angular orientations. The bands of one color may be above the center line of the sheet material and the bands of the other color may be below the center line.

The foregoing objects can be attained by providing the sheet material by a method in which there is provided an elongated die chamber having an extrusion orifice and a discharge passage communicating therebetween. Fluid synthetic thermoplastic resin is supplied to the die chamber at a point spaced from the discharge passage. A differentially colored fluid synthetic thermoplastic resin is supplied at a multiplicity of points in the die chamber which are spaced along the length thereof and between the point of supply of the first mentioned fluid synthetic plastic resin and the discharge passage to produce bands of the differentially colored resin at the spaced points within a matrix of the first mentioned resin flowing about the spaced points. The composite stream of the bands within the matrix is then caused to flow through the perforations of a perforated member and thereby to provide fine striations in the bands of the differentially colored resin and extending in the direction of flow of the composite stream towards the extrusion orifice. This composite stream is then extruded and has the differentially colored synthetic thermoplastic resin encapsulated within a matrix of the first mentioned synthetic thermoplastic resin, with the differentially colored synthetic plastic resin providing generally transversely extending bands of differential color along the length of the extruded composite stream with fine striations of the differential color extending longitudinally of the extruded composite stream.

The points of supply of the differentially colored fluid synthetic thermoplastic resin may be helically moved a limited distance along the length of the die chamber to produce diagonally extending bands, and they may be spaced above and below the center line of the die chamber. In a preferred aspect of the method, the differentially colored fluid synthetic thermoplastic resin supplied at the points above the center line is of a first differential color and that supplied below the center line of the die chamber is of a second differential color, thereby producing a three-color synthetic plastic material having intersecting bands of two different colors. Most desirably, the perforated member has a multiplicity of perforations therein which are spaced apart by narrow solid segments about which the composite stream is caused to flow to produce the striations.

To practice the process, there is utilized an extrusion assembly which includes an extrusion die block having a chamber therein, an elongated extrusion orifice in one surface thereof and a discharge passage between the chamber and the orifice. A first feed conduit extends to the chamber at a point spaced to the opposite side thereof from the discharge passage for supplying a matrix of fluid synthetic thermoplastic resin, and at least one additional feed conduit to the chamber has a portion within the die member extending generally parallel to the extrusion orifice and supplies a differentially colored fluid synthetic thermoplastic resin. In addition, there is at least one sleeve member in the chamber extending genrally parallel to the extrusion orifice and it has a bore therein communicating with the additional feed conduit and a multiplicity of discharge openings communicating with the bore and opening adjacent the extrusion orifice. A perforated member is provided in the discharge passage and has a multiplicity of relatively small perforations therein, some of which are spaced apart by relatively narrow solid segments, whereby the composite stream passes through the perforations of the perforated member prior to discharge from the extrusion orifice. The differentially colored fluid synthetic plastic resin is caused to flow about the narrow solid segments between the perforations which results in flow disturbance and striations in the composite stream.

The perforated member is preferably comprised of an insert block having perforations therein and a screen member retained within the insert block whereby the composite plastic stream passes through block perforations and the openings of the screen member which provides the narrow solid segments. A pair of sleeve members are desirably provided in the chamber vertically spaced above and below the center line, and distributor elements are disposed in the bores of the sleeve members to provide intermittent flow of resin through the discharge openings. The means driving the distributor elements to provide intermittent flow above the center line are driven oppositely from the direction of movement of the distributor element in the sleeve below the center line.

The present invention is advantageously employed with various synthetic thermoplastic materials such as cellulose acetate and cellulose acetate/butyrate. Various dyes and pigments may be used to provide color or varying density of coloration to one or both plastic streams to achieve the visual differentiation in color, refraction or transparency.

The term "differentially colored material" is intended to encompass materials which are visually distinguishable from the material of the body of the sheet material to provide a visual pattern effect and includes the use of colors or substantial lack of color distinct from that of the body of the sheet material and the use of the same color but distinct optical properties so as to produce variation in light refraction or transmission with resultant visual pattern effect.

DETAILED DESCRIPTION OF THE ILLUSTRATED EMBODIMENT

Figure 1:
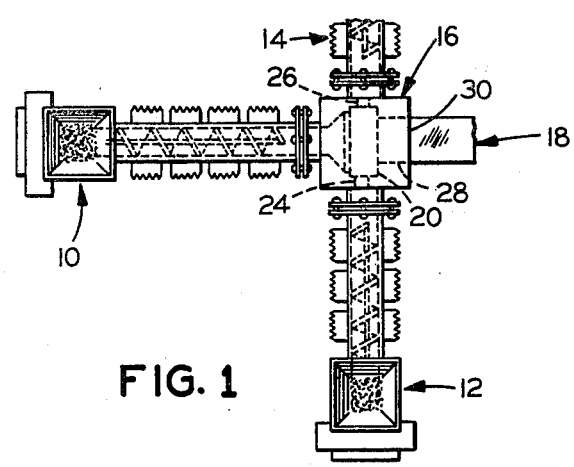
FIG. 1 is a plan view of an extruder assembly for practicing the present invention with the sheet material issuing therefrom only fragmentarily illustrated.
Figure 2:
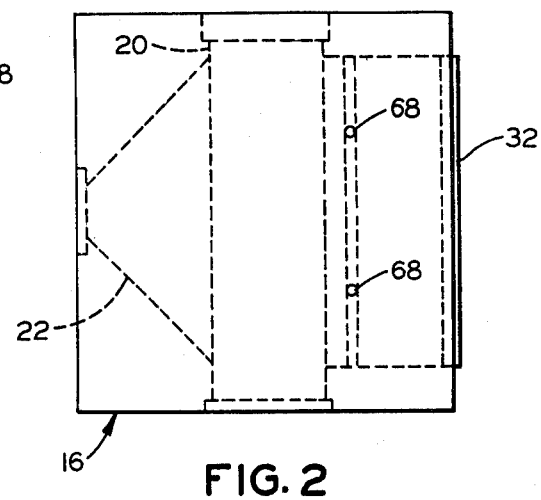
FIG. 2 is a plan view of the die block assembly to an enlarged scale.
Figure 3:
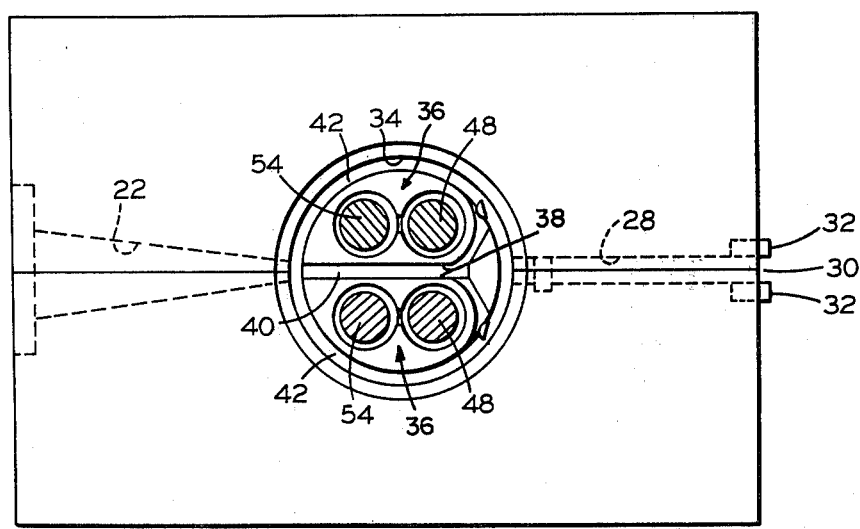
FIG. 3 is a side elevational view of the die block assembly of the apparatus in FIG. 1 drawn to a greatly enlarged scale and with portions thereof in section to show internal construction.
Figure 4:
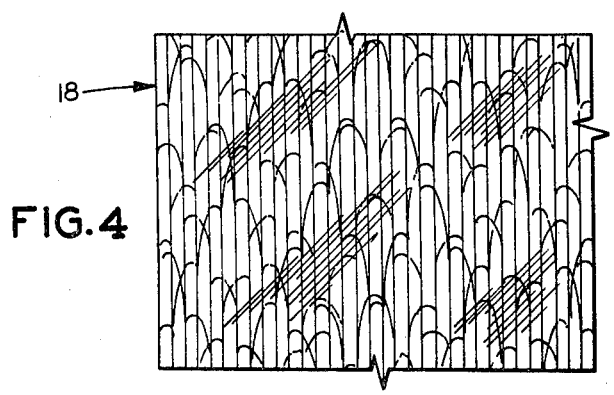
FIG. 4 is a plan view of sheet material produced in accordance with the present invention and employing the so-called Havana pattern.

Turning now in detail to FIGS. 1–3 and 5–7 of the attached drawings, therein illustrated in an extruder assembly for producing a differentially colored synthetic plastic sheet material having spaced bands of a differential color at two depths within the matrix of a first color and especially adapted to produce a striated "Havana pattern" illustrated in FIG. 4. As seen in FIG. 1, an extruder assembly includes a main or matrix extruder generally designated by the numeral 10, a first crosshead extruder generally designated by the numeral 12, a second crosshead extruded extruder fragmentarily illustrated and generally designated by the numeral 14 and a die block assembly generally designated by the numeral 16 with the sheet material produced thereby being generally designated by the numeral 18.

The die block of the assembly 16 has a large chamber therein generally designated by the numeral 20, a first feed conduit 22 from the main extruder 10, and a second feed conduit 24 from the crosshead extruder 12, and a third feed conduit 26 from the crosshead extruder 14. A discharge passage 28 extends from the chamber 20 to the extrusion orifice 30 (seen in FIG. 3) which is provided in the surface of the die block opposite that having the feed conduit 22. As also seen in FIG. 3, the depth dimension of the extrusion orifice 30 is controlled by the die lips 32 which may be adjusted by adjusting bolts (not shown). For purposes of clarity, illustration of heat exchange conduits, thermocouples, adjusting screws, drive mechanism for the screws and the like has been omitted.

As best seen in FIGS. 2 and 3, the feed conduit 22 opens into an enlarged manifold 34 of circular cross section extending across the length of the die chamber 20 so as to supply resin from the extruder 10 across the entire length thereof. Seated within the die chamber 20 are a pair of sleeves generally designated by the numeral 36. The sleeves 36 have generally rectilinear opposed surfaces 38 and are spaced apart by spacing ribs (not shown) to provide a channel 40 therebetween aligned with the feed conduit 22 and the discharge passage 28. The sleeves 36 are also spaced from the walls of the die chamber 20 by spacing ribs (not shown) on the outer surfaces thereof to provide channels 42 therebetween.

Each of the sleeves 36 has a circular bore 44 in the trailing portion thereof and a circular bore 46 in the leading portion thereof, and the two bores communicate through a feed passage 47. The bore 44 comprises the feed bore and is in communication with the corresponding feed conduit 24, 26.

Figure 5:
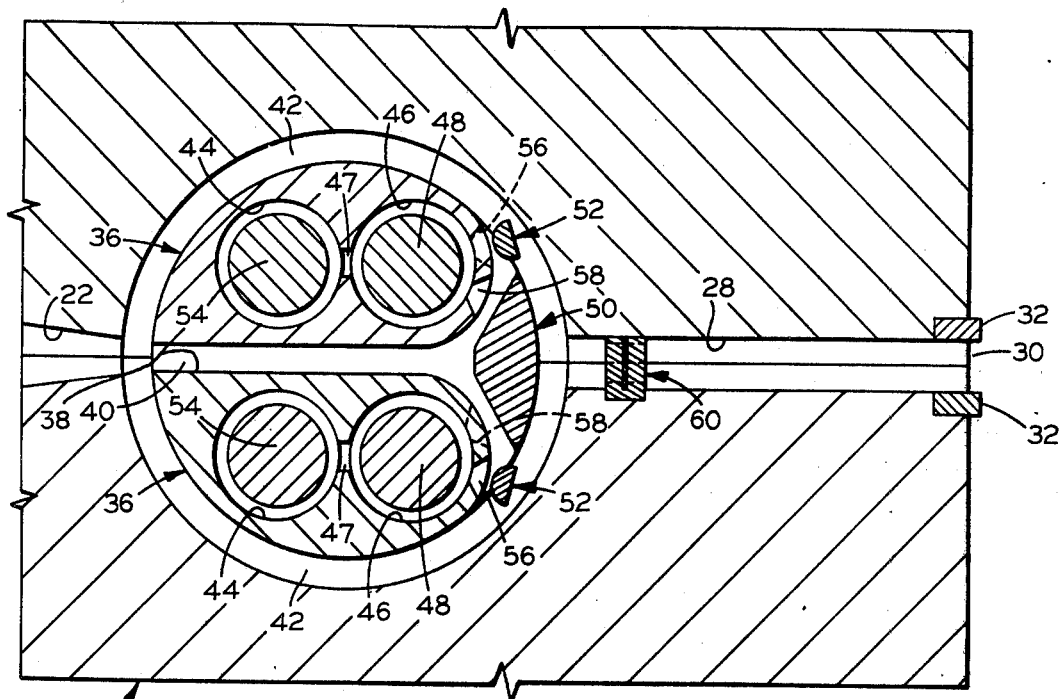
FIG. 5 is a fragmentary side elevational view of the die block assembly drawn to a scale enlarged from that of FIG. 3.

As best seen in FIG. 5, the sleeves 36 each have two rows of staggered, elongated slot-like discharge openings 56 and 58 which have outwardly diverging sidewalls and through which the resin passes. Rotatably seated in the bores 46 are metering screws 48 with helical lands (not shown) which alternately discharge resin through the adjacent staggered discharge openings 56, 58 of the two rows as the lands rotate thereby, thus producing intermittent and alternate discharge through the adjacent staggered openings of the two rows. The screws 48 are driven by suitable drive means (not shown) which is connected thereto outwardly of the die block 16.

Seated within the leading end of the die chamber 20 is a flow diverter generally designated by the numeral 50 which has a streamlined configuration conforming to the adjacent surfaces of the die chamber 20 and sleeves 36. The flow diverter 50 is positioned within the die chamber 20 by suitable means on the ends thereof (not shown) mounted within the die block 16. Diverter bars generally designated by the numeral 52 are provided in alignment with the outer row of discharge openings 56 in the sleeves 36. Lastly, feed members 54 are provided in the bores 44 to facilitate flow of resin along the length thereof.

Figure 7:
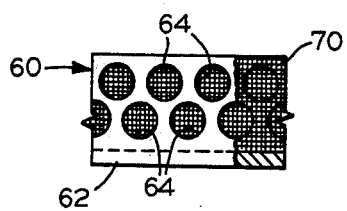
FIG. 7 is a fragmentary front elevational view of the perforated member subassembly with a portion thereof partially in section to reveal internal construction.
Figure 6:
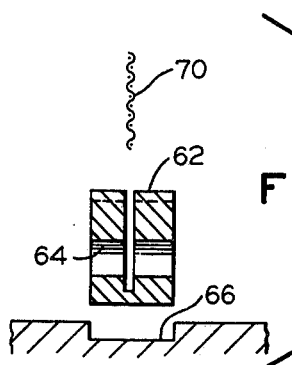
FIG. 6 is a fragmentary exploded view of the elements of the perforated member subassembly drawn to a still further enlarged scale.

In the discharge passage 28 of the die block assembly 16 is positioned a perforated member assembly generally designated by the numeral 60. As best seen in FIGS. 6 and 7, the perforated member subassembly 60 is comprised of a metal block 62 which is provided with two rows of perforations 64 extending across the full length thereof so that synthetic resin flowing through the passage 28 may pass therethrough. The lower portion of the metal block 62 seats in a groove 66 milled in the lower half of the die block assembly 16 and the upper portion is held in position by screws 68 as seen in FIG. 2. Seated in a vertically extending slot in the metal block 62 is a metal screen member 70 which thus provides narrow metal segments in the path of flow of the resin through the perforation 64 in the metal block 62. As will be appreciated, the metal block 62 provides support for the flexible screen member 70 so that it may resist distortion thereof under the substantial pressures of the resin flowing through the discharge passage 28.

Further details concerning the construction of preferred apparatus for producing the basic Havana pattern may be found in U.S. Pat. No. 3,792,945 granted Feb. 19, 1974 to Applicant herein.

Turning now to operation of the apparatus, fluid synthetic thermoplastic resin from the main extruder 10 is fed through the feed conduit 22 to the manifold 34 and thence into the upstream portion of the die chamber 20. The resin is then caused to flow about the surfaces of the sleeves 36 through the channels 40, 42.

Simultaneously, differentially colored fluid synthetic thermoplastic resin is fed from the crosshead extruders 12, 14 through the feed conduits 24, 26 to the feed bores 44 of the sleeves 36. The resin then flows at a relatively uniform rate through the feed passages 47 to the bores 46. The screws 48 rotating within the bores 46 discharge the fluid synthetic thermoplastic resin on an intermittent basis through the discharge openings 56, 58 alternately in each of the sleeves 36, thus producing a discharge of resin which progresses along the length of the rows of discharge openings 56, 58.

The flow diverter 50 and the flow diverter bars 52 deflect the matrix resin flowing through the channels 40, 42 into the discharge openings 56, 58 so as to encapsulate the differentially colored resin issuing therethrough. In this manner, the differentially colored resin is completely encapsulated within the main stream of the matrix resin and smearing is avoided. Moreover, the diverted matrix resin passing into the discharge openings 56, 58 facilitates the removal of the differentially colored resin therefrom.

The composite resin stream of resin containing the encapsulated differentially colored resin from the crosshead extruders 12, 14 passes towards the die lips 32 through the discharge passage 28. As it flows therealong, it encounters the perforated member subassembly 60 and must flow through the perforations 64 of the metal block 62 and the openings of the screen member 70 therein. As the differentially colored stream components flow through the screen member 70, the narrow solid segments provided by the mesh of the screen member 70 distort the flow and cause a portion of the otherwise crisply defined diagonal bands of color to be distorted longitudinally.

Figure 8:
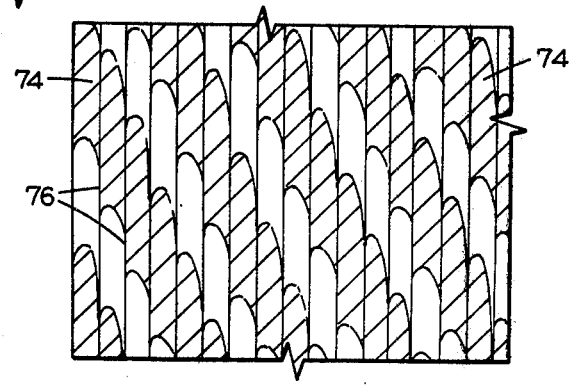
FIG. 8 is a fragmentary plan view of the lower half of the sheet material of FIG. 4.
Figure 9:
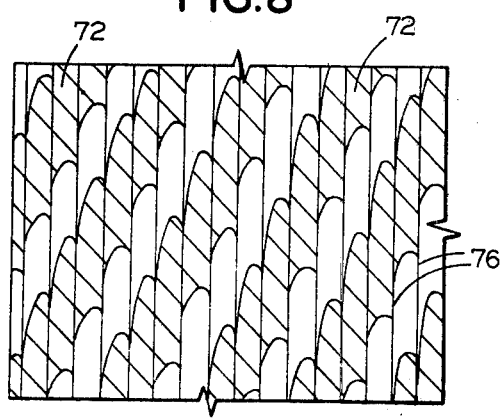
FIG. 9 is a fragmentary plan view of the upper half of the sheet material of FIG. 4.

Typical sheet material which may be produced in accordance with the apparatus previously described is illustrated in FIG. 4 of the accompanying drawings. The plan view FIG. 4 shows the diagonal bands of color 72 from the upper sleeve 36 and the diagonal bands of color 74 from the lower sleeve 36, both extending diagonally to the center line of the sheet material and crossing each other at various points to produce a basketweave pattern. However, instead of sharply delineated bands extending only diagonally, there are striations 76 which extend longitudinally of the sheet material effected by the metal mesh of the screen member 70. The plan views, FIGS. 8 and 9, respectively, illustrate the disposition of the differentially colored bands within the matrix resin in the lower and upper portions of the sheet material.

As has been indicated previously, the grid pattern can be varied to produce different angular arrangements of the intersecting bands, and two differentially colored resins can be utilized to produce intersecting bands of different colors.

Various other constructions for the perforated member may be employed so long as the narrow solid segments are dimensioned to effect the desired minor interference with the flow of the differentially colored bands to produce the narrow longitudinal striations. Although boring a block to provide fine or narrow wall segments is possible, the wall sections tend to be weak. Similarly, a self-supporting wire mesh tends to be limited by the wire thickness necessary to achieve desired strength to resist the pressures producing deflection thereof. If the extruder is operated at relatively low pressure, other variations are more feasible.

Various patterns may be obtained by using different combinations of screws or other intermittent discharge means such as paddle shaped members which will discharge across the entire surface of the discharge openings 56 simultaneously, by varying the relative rates of speed of the intermittent discharge means, by varying their direction of rotation, by oscillating their speed of rotation, etc. Adjustments in the matrix resin flow are conveniently adjusted not only by the pressure developed in the extruder but also by variation in the flow restriction caused by the adjustable restrictor bars.

As will be readily appreciated, the novel die block assembly required for the method of the present invention may be fabricated from relatively few parts and is simple to construct and to maintain while at the same time ensuring troublefree operation. Variations in pattern and color may be readily effected and the resultant patterns are substantially uniform along the length of the sheet material and have attractive characteristics including the longitudinal striations.

Having thus described the invention, I claim:

1. Differentially colored extruded synthetic thermoplastic sheet material comprising a matrix of synthetic thermoplastic resin and a multiplicity of bands of differentially colored thermoplastic resin encapsulated therein, some of said bands extending angularly to others of said bands so as to intersect therewith and provide a grid pattern, the bands of one angular orientation being disposed at a depth within the matrix different from that of the other angular orientation, a multiplicity of each orientation of said bands being provided across the width of said sheet material, said bands having relatively narrow striations extending longitudinally of the sheet material.

2. The sheet material in accordance with claim 1 wherein the bands of one angulr orientation are of a first color distinct from that of the matrix and the bands of the other angular orientation are of a color distinct from that of the matrix and of the bands of the first angular orientation, said striations of said bands producing some blending of the colors of the bands of the two different angular orientations.

3. The sheet material in accordance with claim 2 wherein the bands of one color are above the center line of said sheet material and the bands of the other color are below the center line.

* * * * *